United States Patent [19]
Ohno

[11] Patent Number: 5,657,167
[45] Date of Patent: Aug. 12, 1997

[54] FOCAL LENGTH CHANGEABLE LENS SYSTEM

[75] Inventor: Kazunori Ohno, Saitama-ken, Japan

[73] Assignee: Fuji Photo Optical Co., Ltd., Saitama-ken, Japan

[21] Appl. No.: 420,343

[22] Filed: Apr. 11, 1995

[30] Foreign Application Priority Data

Apr. 11, 1994 [JP] Japan ................................. 6-072262
Jun. 14, 1994 [JP] Japan ................................. 6-131830

[51] Int. Cl.$^6$ .......................... G02B 15/14; G02B 13/18
[52] U.S. Cl. ................................. 359/691; 359/717
[58] Field of Search ................................. 359/689, 690, 359/691, 717

[56] References Cited

U.S. PATENT DOCUMENTS

| 4,925,280 | 5/1990 | Hashimoto | 359/691 |
| 5,155,629 | 10/1992 | Ito et al. | 359/691 |
| 5,280,390 | 1/1994 | Ito | 359/691 |
| 5,339,195 | 8/1994 | Ogata | 359/691 |
| 5,357,374 | 10/1994 | Ohno | 359/691 |
| 5,381,269 | 1/1995 | Estelle | 359/691 |
| 5,388,006 | 2/1995 | Koelsch | 359/691 |
| 5,473,473 | 12/1995 | Estelle et al. | 359/691 |
| 5,485,314 | 1/1996 | Sato | 359/691 |

FOREIGN PATENT DOCUMENTS 46-39315  11/1971  Japan .

*Primary Examiner*—Scott J. Sugarman
*Attorney, Agent, or Firm*—Young & Thompson

[57] ABSTRACT

A lens system comprises a stationary negative power singlet and a positive power singlet which is changed between two specific axial positions so as to yield a short focal length suitable for wide angle photography and a long focal length suitable for a tele-photography, respectively, and satisfies the following condition:

$$-2.0 < f1/f2 < -1.7$$

where f1 is the focal length of a first negative power singlet component, and f2 is the focal length of a second singlet component of positive power.

16 Claims, 10 Drawing Sheets

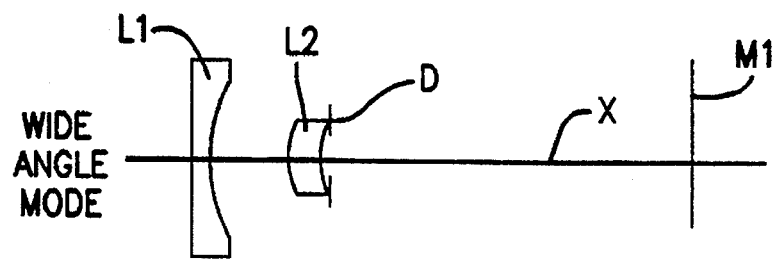
FIG. 2A WIDE ANGLE MODE
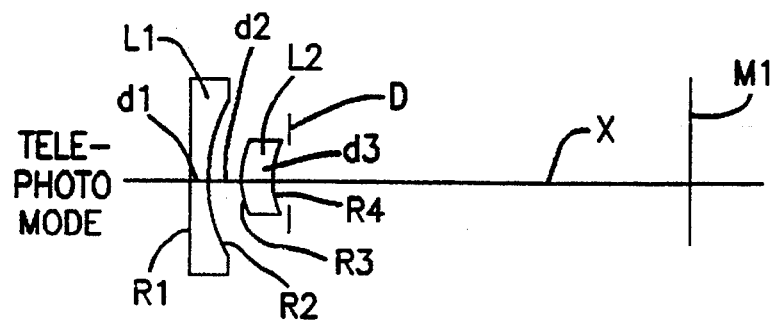
FIG. 2B TELE-PHOTO MODE
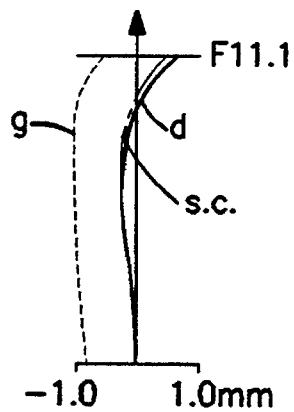
FIG. 3A
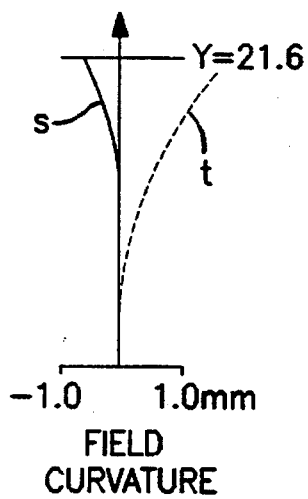
FIG. 3B
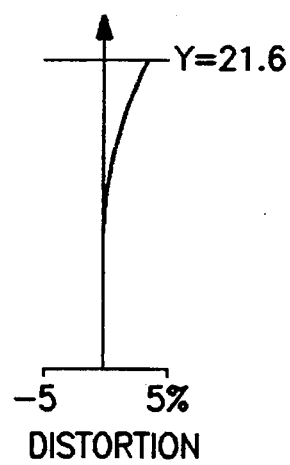
FIG. 3C

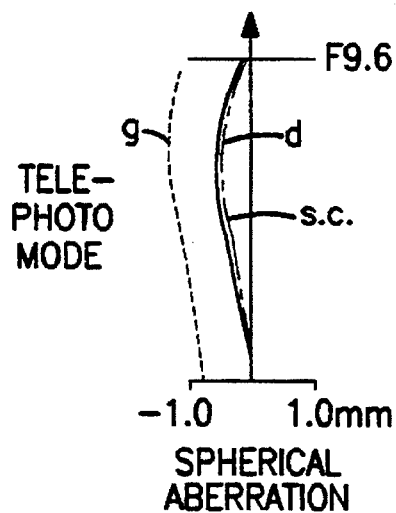
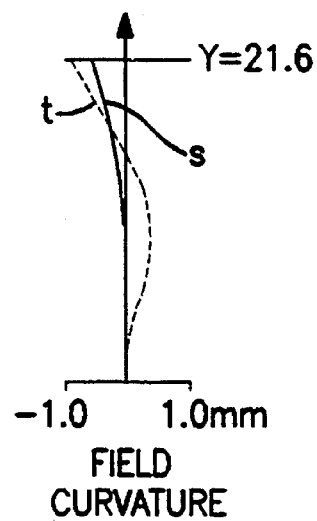
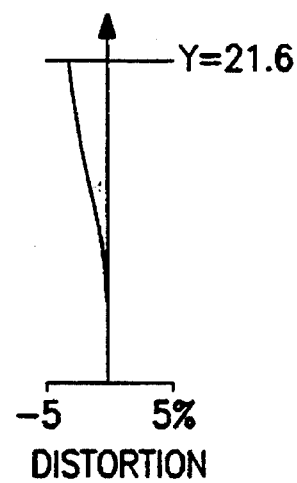
FIG. 3D     FIG. 3E     FIG. 3F
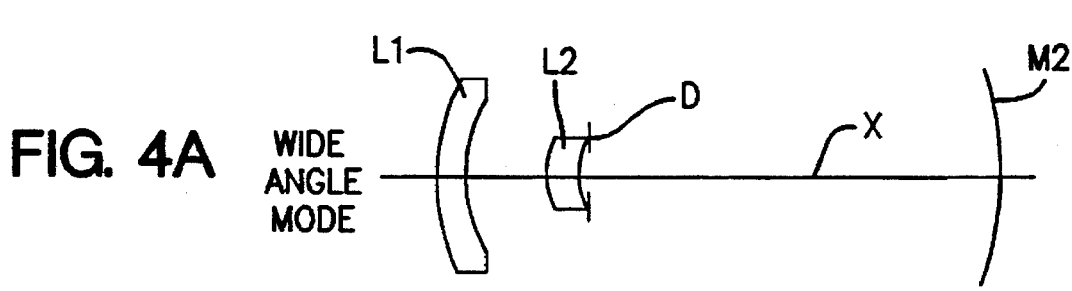
FIG. 4A
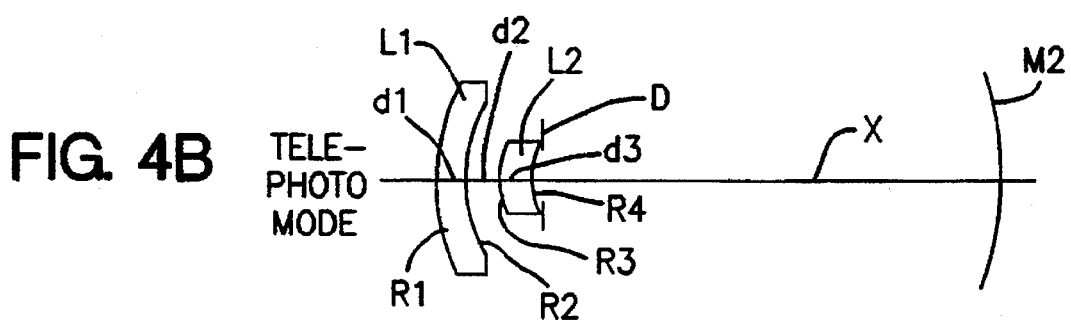
FIG. 4B

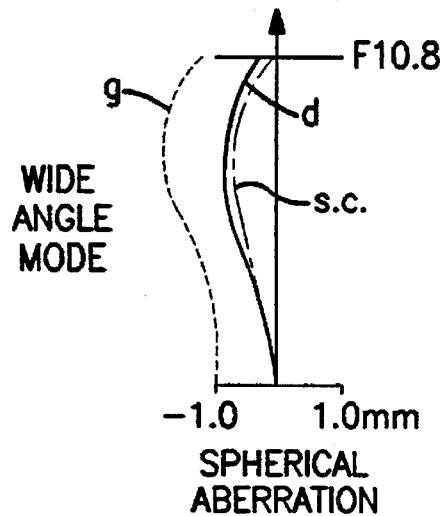
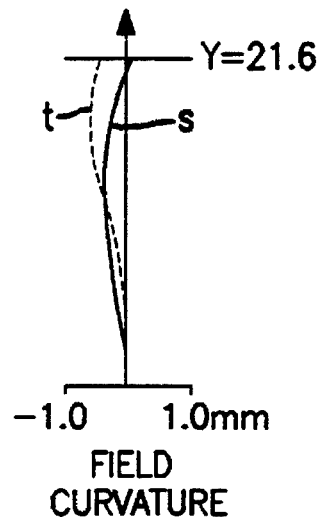
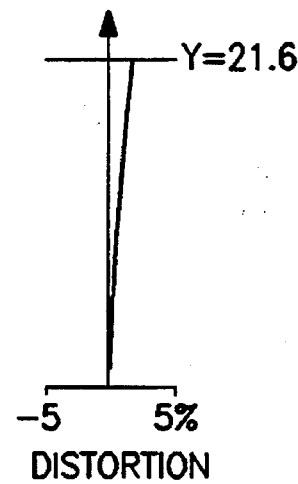
FIG. 5A    FIG. 5B    FIG. 5C
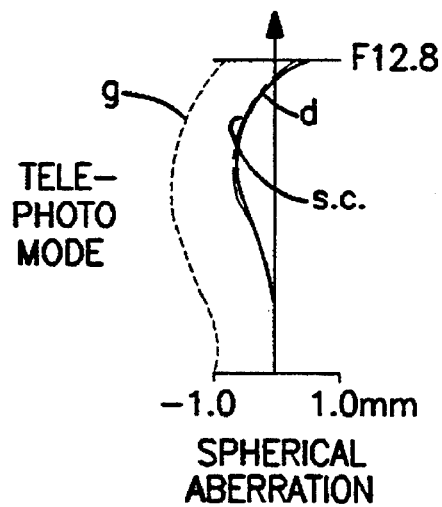
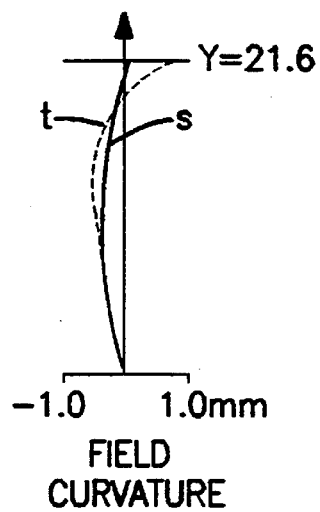
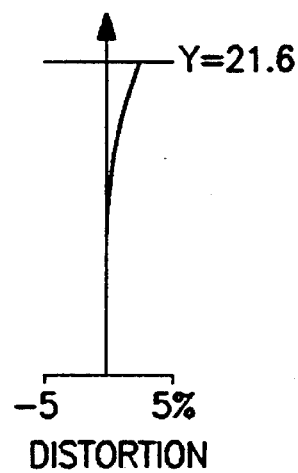
FIG. 5D    FIG. 5E    FIG. 5F

FIG. 6A WIDE ANGLE MODE

FIG. 6B TELE-PHOTO MODE

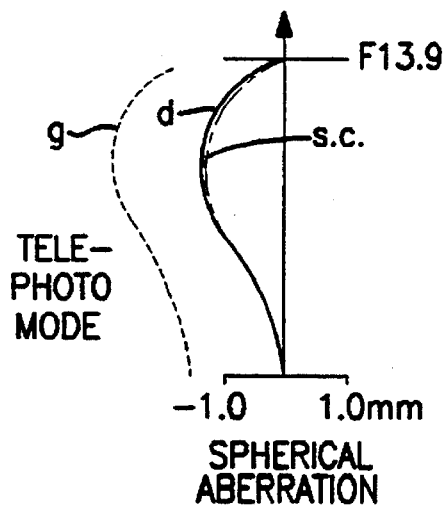
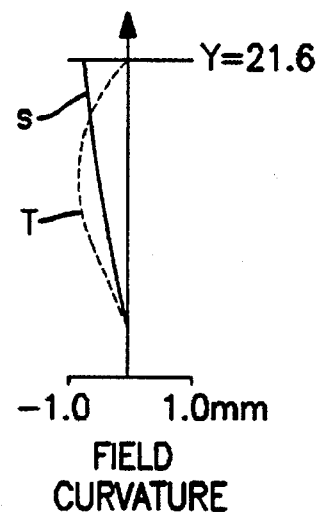
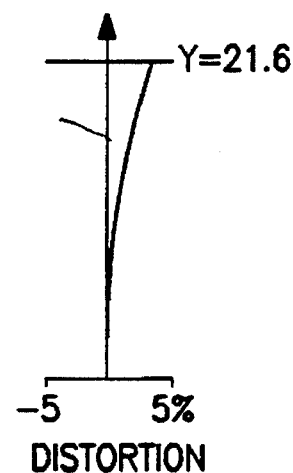
FIG. 7D     FIG. 7E     FIG. 7F
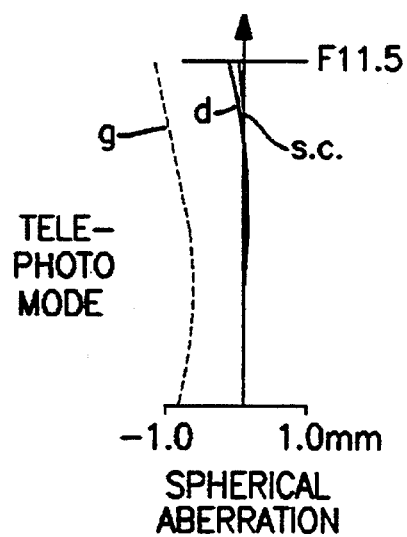
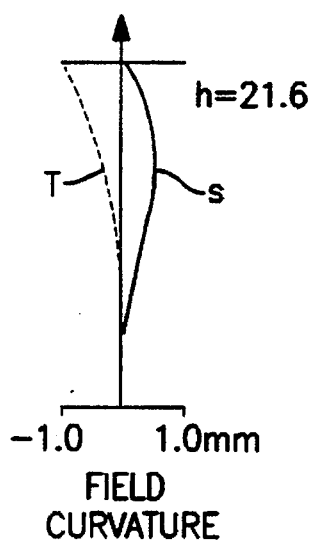
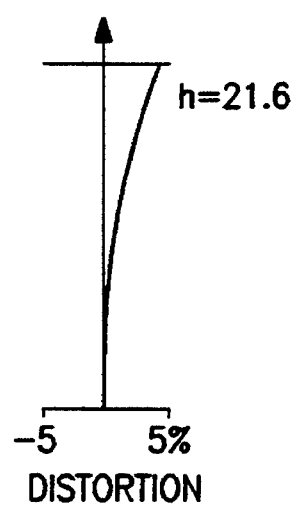
FIG. 9D     FIG. 9E     FIG. 9F

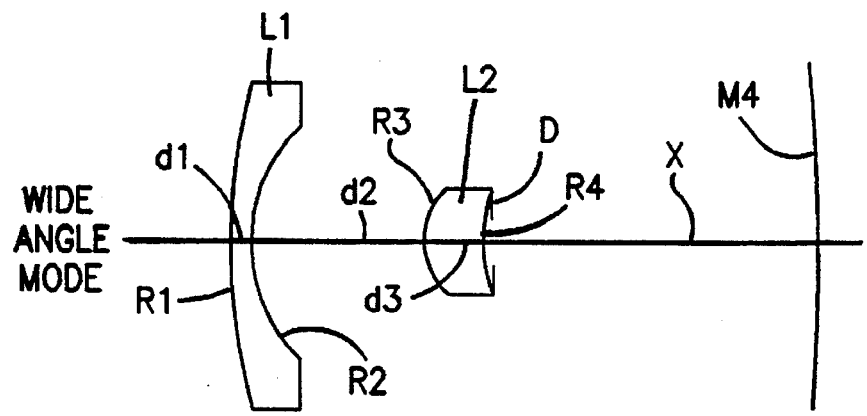
FIG. 8A WIDE ANGLE MODE
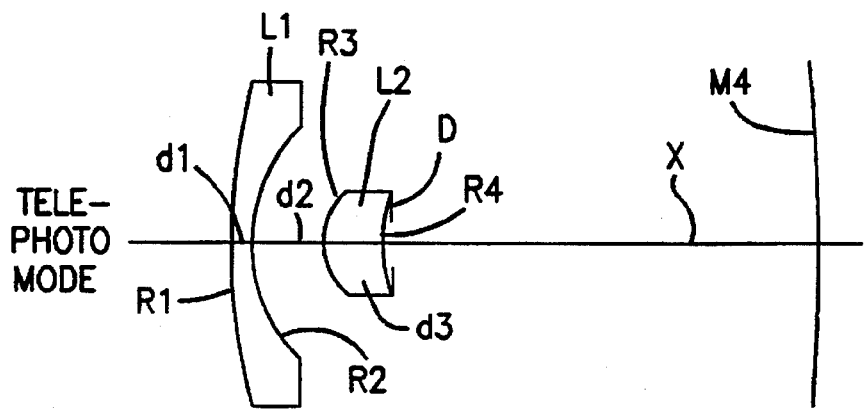
FIG. 8B TELE-PHOTO MODE
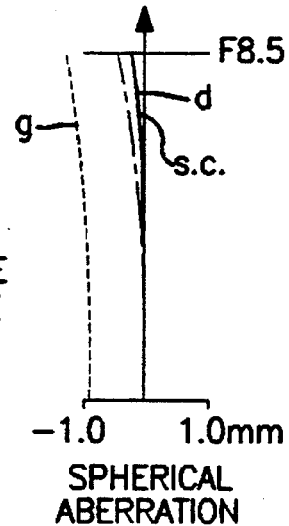
FIG. 9A
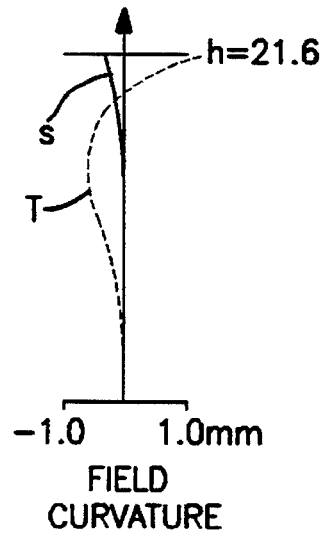
FIG. 9B
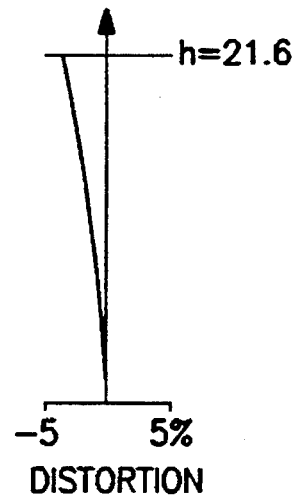
FIG. 9C

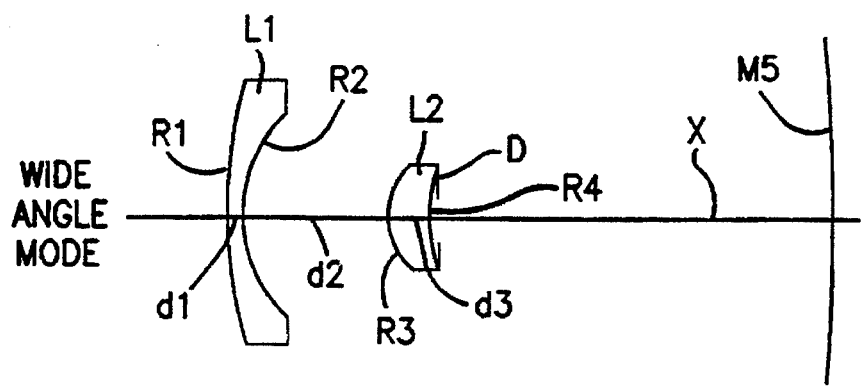
FIG. 10A WIDE ANGLE MODE
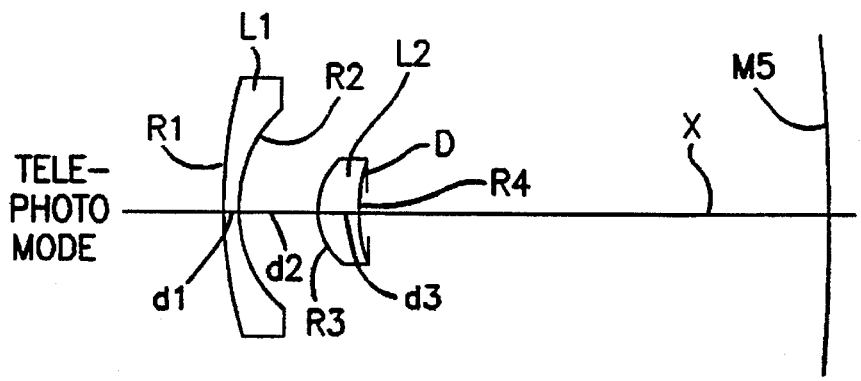
FIG. 10B TELE-PHOTO MODE
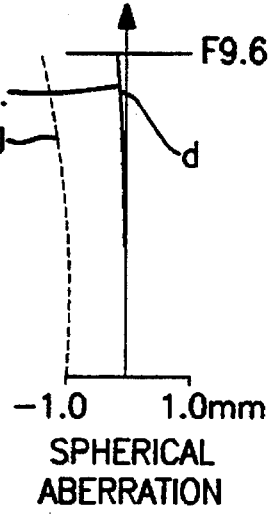
WIDE ANGLE MODE
SPHERICAL ABERRATION
FIG. 11A
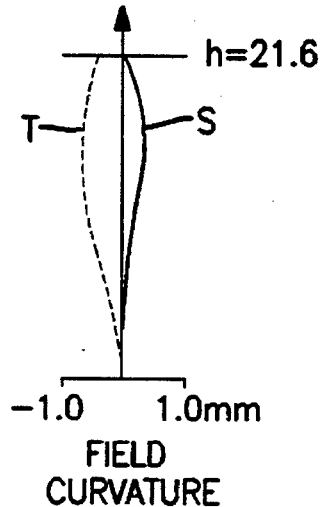
FIELD CURVATURE
FIG. 11B
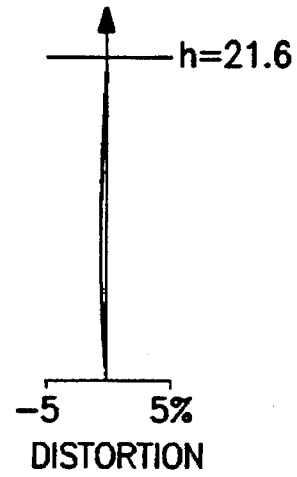
DISTORTION
FIG. 11C

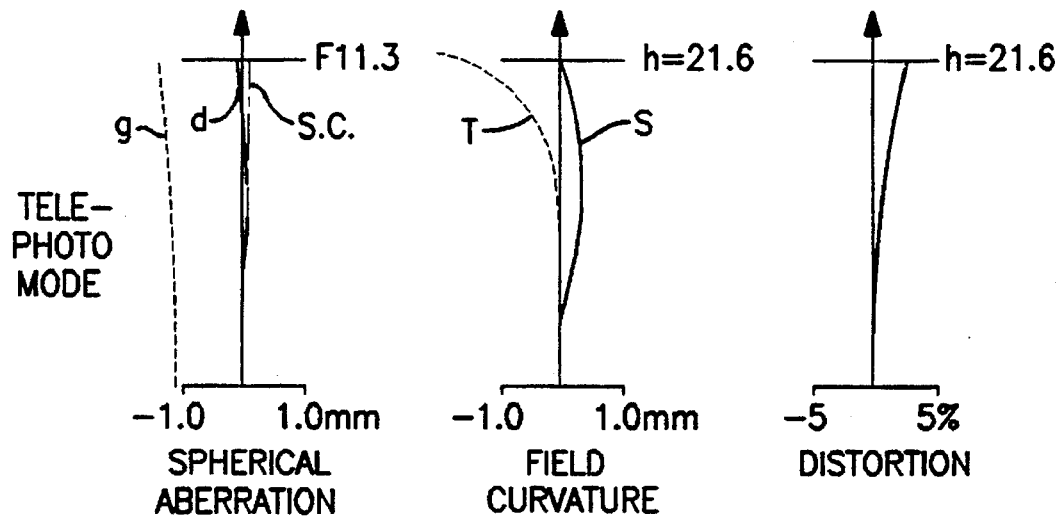
FIG. 11D   FIG. 11E   FIG. 11F
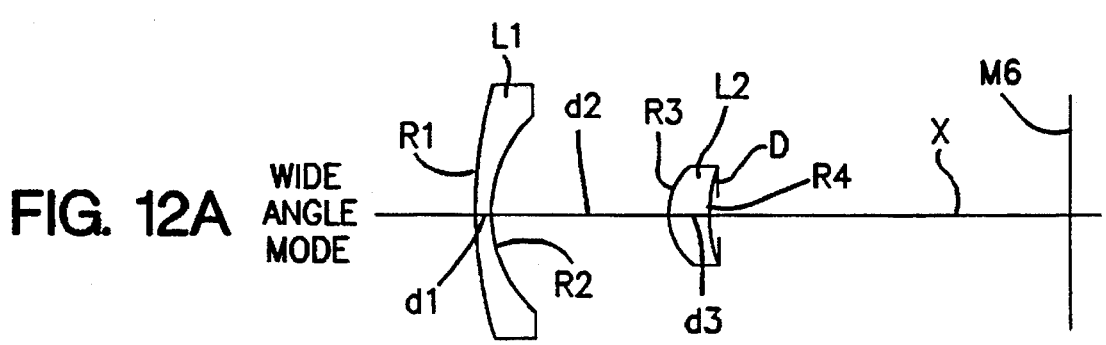
FIG. 12A WIDE ANGLE MODE
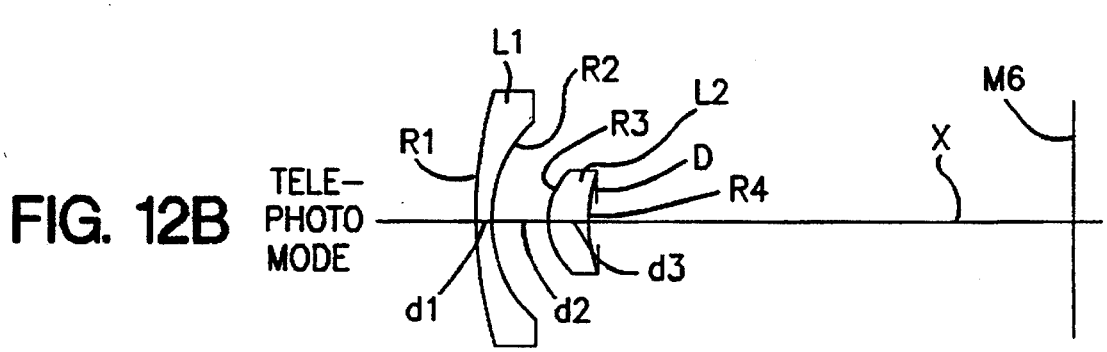
FIG. 12B TELE-PHOTO MODE

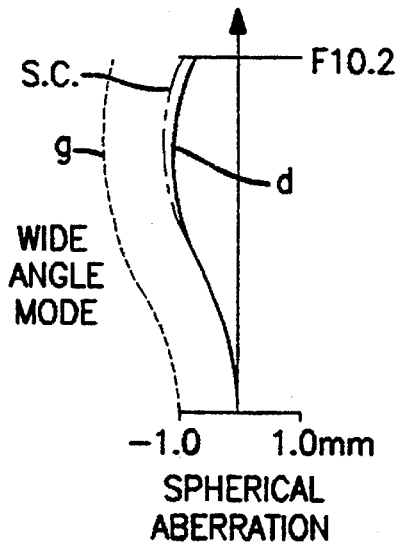
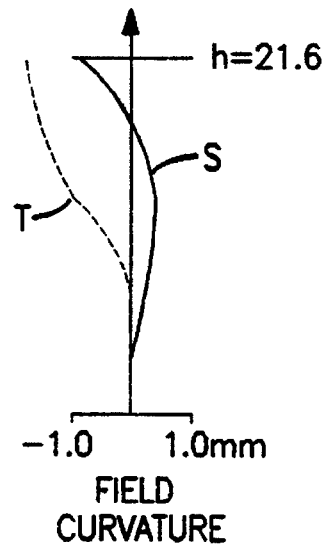
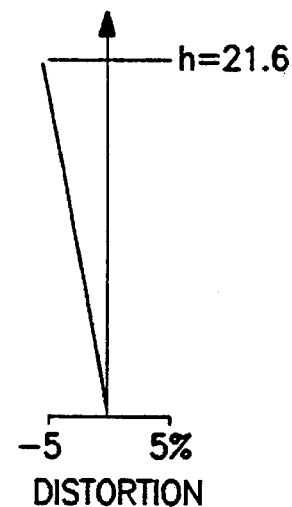
FIG. 13A    FIG. 13B    FIG. 13C
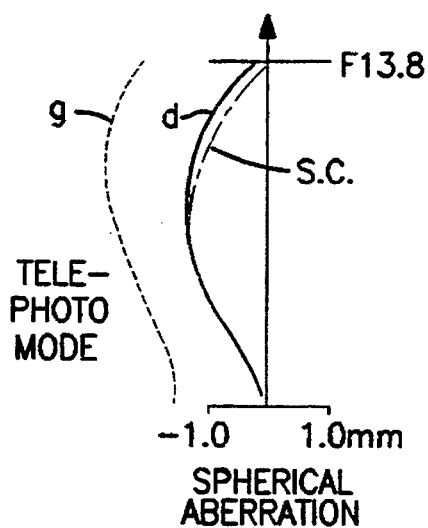
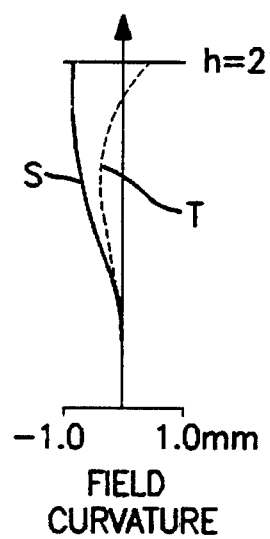
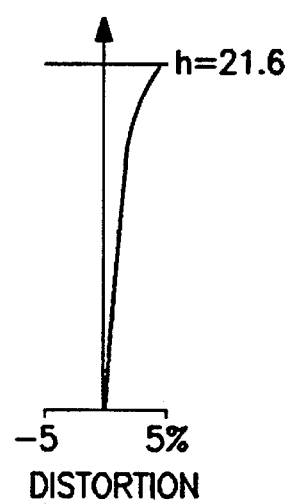
FIG. 13D    FIG. 13E    FIG. 13F

FOCAL LENGTH CHANGEABLE LENS SYSTEM

BACKGROUND OF THE INVENTION

1. Field of the Invention

The present invention relates to a lens system changeable between two specific focal length for suitable use with compact still cameras, and, more particularly, to a lens system changeable between two specific focal length for achieving a wide angle photography mode and tele-photography mode, respectively.

2. Description of Related Art

Most lens systems changeable between a wide angle photography mode and a tele-photography mode consist of more than two lens groups. In one type of lens systems of this kind lens groups are moved along the optical axial to achieve focusing from relatively long distances to moderately close distances. Another type of lens systems of this kind includes a converter lens element cooperating with a master lens group for achieving a high ratio of focal length for wide angle photography to for tele-photography. Almost all of this type of lens systems include a positive power master lens group arranged on the object end. Such a focal length changeable lens system having a master lens group which is moved along the optical axis to achieve a long local length imposes various constraints on the overall size and other relationships of elements within the system including a lens barrel and a shutter which are not always desired. Together, a focusing mechanism is essential to be installed in the camera so as to cooperate with the master lens group. These constrains render compact still cameras difficult to be simple in structure and small in size and additionally, unfavorable to be manufactured at low costs.

SUMMARY OF THE INVENTION

It is an object of the present invention to provide a focal length changeable lens system which cooperates with a simple structure of focal length changing mechanism.

It is another object of the present invention to provide a focal length changeable lens system which has a feature of focusing and cooperates with a simple operation of focusing.

It is still another object of the present invention to provide a focal length changeable lens system which is suitable for compact still cameras and enables compact still cameras with high functional performance to be manufactured at low costs.

Before describing the present invention in detail, reference is made to FIGS. 1, for the purpose of providing a brief background that will enhance an understanding of a focal length changeable lens system of the present invention.

A focal length changeable lens system adjustable in focus at both wide angle end (EDW) and tele-photo end (EDT) according to the present invention is schematically illustrated. The focal length changeable lens system comprises first and second lens group, namely a negative power meniscus group L1 and a positive power meniscus group L2 arranged in order from the object end along the optical axis X and has a diaphragm or lens stop D positioned at a distance behind the second lens group L2. The first lens group L1 is stationary with respect to the lens system. The second lens group L2 and fixed lens stop D are adapted to be shifted along the optical axis X as a group during changing the focal length between a short focal length for a wide angle photography mode and a long focal length for a tele-photo (tele-photographic) mode, but in fixed relation to each other during changing the focal length.

As the second lens group L2 moves toward the first lens group L1 along the optical axis X, the overall focal length of the focal length changeable lens system gradually increases in addition, because the first lens group L1 does not move, the lens system shifts its focal point. Assuming that the lens system satisfies the following equation, the lens system has the same focal point for different two axial positions of the second lens group L2.

$$f1 = -(F_W \cdot F_T)^{1/2}$$

where $F_W$ is the shortest overall focal length of the lens system in the wide angle photographic mode;

$F_T$ is the longest overall focal length of the lens system in the tele-photo mode.

This equation is obtained as follows:

The overall focal length FL of the lens system is expressed as follows:

$$1/FL = 1/f1 + 1/f2 - d_P/(f1 \cdot f2)$$

$$\therefore d_P = (1/f1 + 1/f2 - 1/FL)(f1 \cdot f2)$$

where f1 is the focal length of the first element;

f2 is the focal length of the second element;

$d_P$ is the distance between principal points of the first and second elements. The back focal length BF of the lens system associated with paraxial ray is expressed as follows:

$$BF = FL(BF - d_P/f1)$$

When expressing the overall length Ld of the lens system associated with paraxial ray by use of the above equations:

$$Ld = BF + d_P$$
$$= f1 + 2f2 - (f1^2 + f^2) \cdot f2/f1 \cdot FL$$

These equations, which are established relating to a lens system consisting of thin lenses, can be practically applied to the lens system of the present invention.

From the fact that the focal length changeable lens system has the same overall length Ld at the wide angle end and the tele-photo end, respectively, the following equation is conducted.

$$f1 = -(F_W \cdot F_T)^{1/2}$$

Specifically, as the second lens group L2 moves from the wide angle end (EDW) toward the telephoto end (EDT), the focal length (FL) gradually increases. During moving the second lens group L2 between the wide angle photographic end (EDW) position and the tele-photographic end (EDT) position, the focal point P shifts between two points, one of which is in a focal plane M. Accordingly, by selectively positioning the second lens group L2 to these wide angle photographic end (EDW) and the tele-photographic end (EDT), the lens system is quickly and easily changed in focal length between two ends, i.e. the wide angle end and a tele-photo end.

In order for the lens system satisfying the above condition to reduce aggravation of spherical aberration and chromatic aberration of each lens group, it is necessary that the lens group consists of more-than-two lens element. This results in a decreased overall compactness of the lens system.

The above-described problems associated with prior art focal length changeable lens systems are believed to be solved by the present invention. According to the present invention, there is provided a focal length changeable lens system comprising a first single lens element which is stationary with respect to the lens system and a second single lens element which is adapted to be shifted along the optical axis X so as to provide a focal point P in the same plane in common to the longest focal length for the tele-photographic mode and the shortest focal length for the wide angle photographic mode.

Specifically, the lens system has a negative power lens element and a positive power lens element arranged in order from the object side and satisfies the following condition:

$$-2.0 < f1/f2 < -1.7 \qquad (I)$$

where f1 is the focal length of the first element;
f2 is the focal length of the second element.

In order for the lens system to reduce angles of rays of light incident on each lens element far from the optical axis, it is desirable that the first and second elements are meniscus.

Distortion which may occur in the wide angle photography mode is greatly related to the positional relationship between these optical elements depending upon focal length of the first and second lens elements. If the upper limit of the condition (I) is exceeded, while the second lens element yield a strong power and greatly reduce aggravation of spherical aberration and coma, nevertheless, the first lens element provides a weak power and aggravates the overall compactness of the lens system. On the other hand, if the lower limit of the condition (I) is exceeded, while the lens system can be reduced in the overall length, nevertheless, the second lens element must have a strong power, so that it is difficult to satisfactorily correct aberrations even if formed as an aspheric element.

According to a preferred embodiment of the present invention, the focal length changeable lens system is adjustable in focus at both wide angle end and tele-photo end is more desirable to satisfy the following conditions:

$$0.6 < f2/F_W < 0.8 \qquad (II)$$

$$4.0 < F_W/R_3 < 7.5 \qquad (III)$$

where $F_W$ is the overall focal length of the lens system at the wide angle end;

$R_3$ is the radius of the object side surface of the second lens element.

The second condition (II) defines the compactness of the lens system. If the upper limit is exceeded, while the lens system achieves favorable optical performance in both wide angle photographic mode and tele-photographic mode, nevertheless, it is hard to decrease the overall length of the lens system. On the other hand, if the lower limit is exceeded, while the overall length of the lens system is reduced, nevertheless, the power of second lens element becomes too strong, so as to provide aggravation of optical performance in both wide angle photographic mode and tele-photographic mode and of focusing performance.

The third condition (III) yields the suitably balanced aberrations of the lens system. If the upper limit is exceeded, spherical aberration and field curvature unfavorably change during focusing. On the other hand, the lower limit is exceeded, while changes in spherical aberration and field curvature are reduced, nevertheless, the field curvature is enhanced, so that it is difficult for the lens system to satisfactorily achieve the optical performance.

In order for the lens system to reduce changes in aberrations, such as field curvature, coma and distortion, a diaphragm or lens stop is disposed behind the second lens element on the image end.

The lens system may have one or more aspheric elements so as to reduce aggravation of spherical aberration and coma which are generally caused by a strong power of second lens group needed to a reduced overall length of the lens system. Specifically, if the second lens element has an aspheric surface on the object end satisfactorily yields correction of spherical aberration. Together, if the second lens element has an aspheric surface on each of the object and image ends satisfactorily correct coma and magnification chromatic aberration which are caused by the object end aspheric surface.

BRIEF DESCRIPTION OF THE DRAWINGS

The above and other objects and features of the present invention will be clearly understood from the following description with respect to a preferred embodiment thereof when considered in conjunction with the accompanying drawings, wherein same numerals have been used herein to denote the same or similar elements throughout the drawings, and in which:

FIG. 2 is a diagrammatic side view of a focal length changeable lens system according to a version of a first preferred embodiment of the present invention;

FIG. 3 shows diagrams of aberrations of the focal length changeable lens system of FIG. 2;

FIG. 4 is a diagrammatic side view of a focal length changeable lens system according to another version of the first embodiment of the present invention;

FIG. 5 shows diagrams of aberrations of the focal length changeable lens system of FIG. 4;

FIG. 6 is a diagrammatic side view of a focal length changeable lens system according to still another version of the first embodiment of the present invention;

FIG. 8 is a diagrammatic side view of a focal length changeable lens system according to a version of a second preferred embodiment of the present invention;

FIG. 9 shows diagrams of aberrations of the focal length changeable lens system of FIG. 8;

FIG. 10 is a diagrammatic side view of a focal length changeable lens system according to another version of the second embodiment of the present invention;

FIG. 11 shows diagrams of aberrations of the focal length changeable lens system of FIG. 10;

FIG. 12 is a diagrammatic side view of a focal length changeable lens system according to still another version of the second embodiment of the present invention; and FIG. 13 shows diagrams of aberrations of the focal length changeable lens system of FIG. 12.

DETAILED DESCRIPTION OF THE PREFERRED EMBODIMENTS

Figure 1:
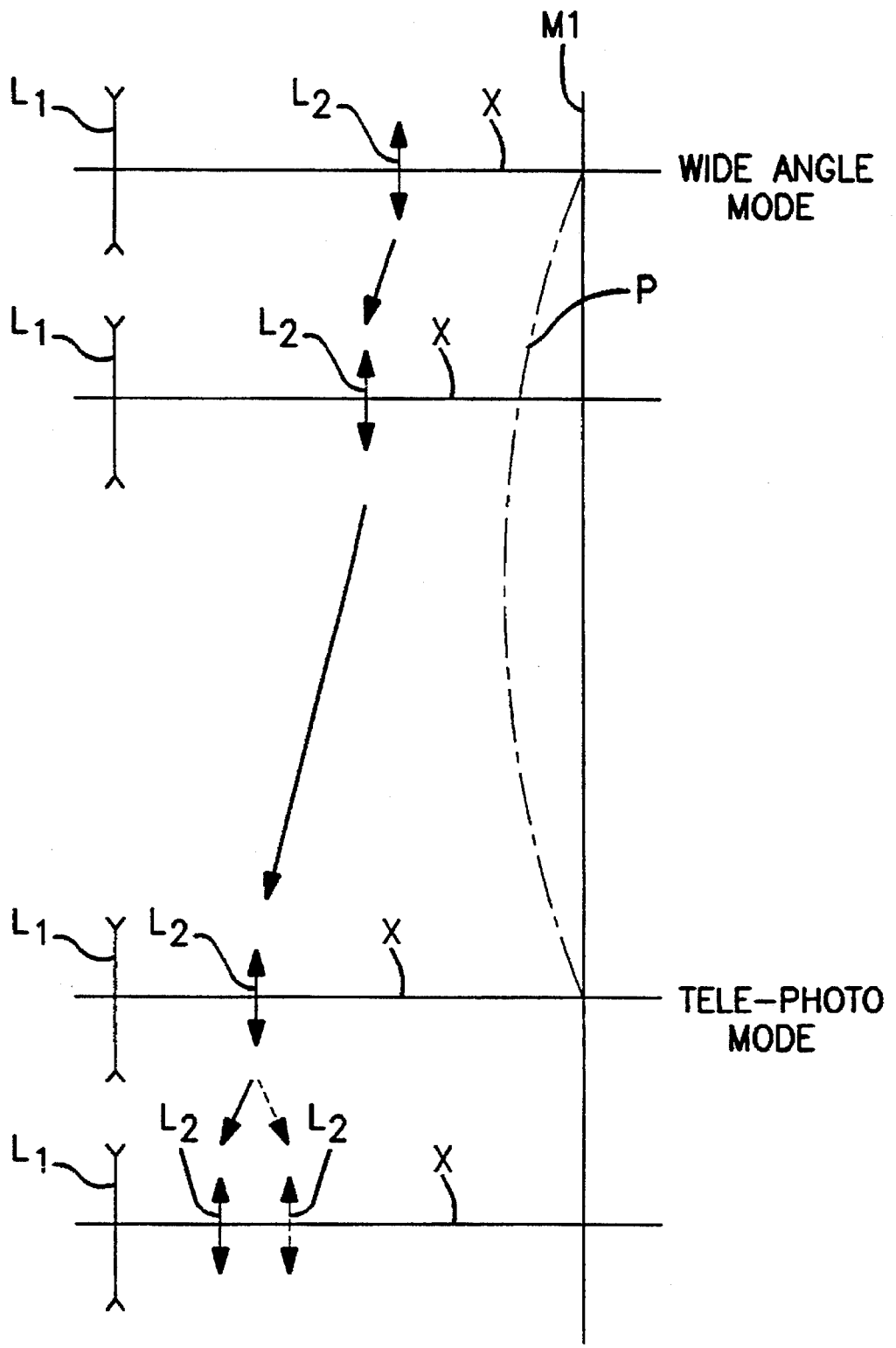
FIG. 1 is a schematic illustration showing a principle of a focal length changeable lens system.

In the following prescription tables where various versions of the invention are set forth, the reference L followed by an arabic numeral indicates the lens element progressively from the object end to the image end of the photographic lens system. The reference S followed by an arabic numeral indicates the lens surface progressively from the object end to the image end of the focal length changeable lens system. The reference radius numbers R are the progressive lens surface radii. The reference axial distance numbers d are the progressive axial distance between adjacent surfaces. Nd is the index of refraction of the lens element. vd is the dispersion of the lens element as defined by the Abbe number. The references $f_1$ and $f_2$ are the focal length of the first lens group L1 and L2, respectively. FL is the overall length of the lens system. and the reference $F_W$ and $F_T$ are the overall focal length of the lens system at the short distance end or wide angle end (EDW) and the long distance end or tele-photo end (EDT), respectively. BF is the back focal length of the lens system. F and 2ω are the lens speed (F number) and the angle of view, respectively.

The focal length changeable lens embodying the present invention preferably has aspheric surfaces, one or more on each of the first and second lens elements, as will be made apparent from the examples in the following tables. The aspheric surface may be defined by the following equation:

$$X = Cy^2/(1 + \sqrt{1-(1+K)C^2y^2}) + a1y^4 + a2y^6 + a3y^8 + a4y^{10}$$

where

X is the surface sag at a semi-aperture distance y from the optical axis X of the lens system;

C is the curvature of a lens surface at the optical axis X equal to the reciprocal of the radius at the optical axis;

K is a conic constant;

a1–a2 are aspheric coefficients.

FIGS. 2, 4 and 6 show various versions of an embodiments of the present invention in which a focal length changeable lens system is changeable in focal length between two fixed focal length for wide angle photography and tele photography.

In the first version of the embodiment shown in FIG. 2, the focal length changeable lens system comprises first and second lens elements, namely a negative power meniscus element L1 having an aspheric surface which is concave relative to an approximately flat image surface M1 and a positive power meniscus element L2 having a convex object end surface. Both surfaces of the second element L2 are aspheric. The lens system further has a diaphragm or lens stop D positioned at a distance of approximately 0.7 mm behind from the image end surface of the second element L2. The first lens element L1 is stationary with respect to the lens system. The lens system L2 and fixed lens stop D are adapted to be shifted along the optical axis X as a group during changing the focal length, but in fixed relation to each other during changing the focal length. The lens stop D is located at a distance of approximately 0.7 mm behind from image end surface of the element L2.

The focal length changeable lens system as shown in FIG. 2 scaled to an image frame of 24×36 mm is substantially described in Table I and

TABLE I

| | Radius of Element Curvature (mm) | Axial Distance Between Surfaces (mm) | N | ν |
|---|---|---|---|---|
| $L_1$ | S1 $R_1$ = 65.325 | $d_1$ = 1.5 | 1.49116 | 57.6 |
| | S2 $R_2$ = 11.845 | $d_2$ = variable | | |
| L2 | S3 $R_3$ = 3.848 | $d_3$ = 2.0 | 1.49116 | 57.6 |
| | S4 $R_4$ = 6.376 | | | |

Aspheric Surface: S2, S3 and S4
Aspheric Parameters:

| | S2 | S3 | S4 |
|---|---|---|---|
| C | 0.08442 | 0.25988 | 0.15684 |
| K | −11.1246 | 0.72597 | 1.14113 |
| a1 | 0.10936 × 10$^{-2}$ | −0.43993 × 10$^{-3}$ | 0.29339 × 10$^{-2}$ |
| a2 | −0.27739 × 10$^{-4}$ | 0.11490 × 10$^{-3}$ | 0.12123 × 10$^{-2}$ |
| a3 | 0.67060 × 10$^{-6}$ | −0.13634 × 10$^{-4}$ | −0.56711 × 10$^{-4}$ |
| a4 | −0.66345 × 10$^{-8}$ | 0.39273 × 10$^{-6}$ | 0.14669 × 10$^{-4}$ |

TABLE I-continued

Zooming Parameters:

| | FL(mm) | BF(mm) | F | 2ω | $d_2$ | Ld |
|---|---|---|---|---|---|---|
| EDW | 26.00 | 26.70 | 9.6 | 79.5° | 5.718 | 35.92 |
| EDT | 34.00 | 30.92 | 11.1 | 64.9° | 1.500 | 35.92 |

The focal length changeable lens system depicted in FIG. 2 and described in Table I has the following parameters described as follows:

| f1 | f2 | f1/f2 | β = $F_T/F_W$ |
|---|---|---|---|
| −29.73 | 15.68 | −1.896 | 1.308 |

As apparent from the above, the focal length changeable lens system shown in FIG. 2 satisfies the condition (I).

FIG. 3 shows diagrams illustrating aberrations, including spherical aberration, field curvature and distortion of the focal length changeable lens system shown in FIG. 2 at the wide angle end (EDW) and the tele-photo end (EDT). As apparent in FIG. 3, the lens system has superior correction for these aberrations.

Referring to FIG. 4 which shows another version of the embodiment of the present invention, a focal length changeable lens system comprises a first negative power meniscus element L1 having, a concave surface relative to a curved image surface M2 and a second positive power meniscus element L2 having a convex object end surface. Both surfaces of the second element L2 are aspheric. The lens system further has a lens stop D positioned at a distance of approximately 0.5 mm behind from the image end surface of the element L2. The first lens element L1 is stationary with respect to the lens system. The lens system L2 and fixed lens stop D are adapted to be shifted along the optical axis X as a group during changing the focal length, but in fixed relation to each other during changing the focal length.

The focal length changeable lens system as shown in FIG. 4 scaled to an image frame of 24×36 mm is substantially described in Table II.

TABLE II

| | Radius of Element Curvature (mm) | Axial Distance Between Surfaces (mm) | N | ν |
|---|---|---|---|---|
| L1 | S1 $R_1$ = 12.334 | $d_1$ = 1.5 | 1.49116 | 57.6 |
| | S2 $R_2$ = 6.815 | $d_2$ = variable | | |
| L2 | S3 $R_3$ = 3.502 | $d_3$ = 1.6 | 1.49116 | 57.6 |
| | S4 $R_4$ = 5.025 | | | |

Aspheric Surface: S3 and S4
Aspheric Parameters:

| | S3 | S4 |
|---|---|---|
| C | 0.28555 | 0.19900 |
| K | 1.321104 | 6.89391 |
| a1 | −0.17274 × 10$^{-2}$ | 0.22077 × 10$^{-3}$ |
| a2 | −0.10561 × 10$^{-2}$ | −0.49381 × 10$^{-2}$ |
| a3 | 0.38793 × 10$^{-3}$ | 0.31032 × 10$^{-2}$ |
| a4 | −0.86029 × 10$^{-4}$ | −0.78680 × 10$^{-3}$ |

Zooming Parameters:

| | FL(mm) | BF(mm) | F | 2ω | $d_2$ | Ld |
|---|---|---|---|---|---|---|
| EDW | 29.00 | 29.73 | 10.8 | 73.4° | 7.145 | 39.98 |
| EDT | 40.00 | 36.38 | 12.8 | 56.8° | 1.500 | 39.98 |

The focal length changeable lens system depicted in FIG. 4 and described in Table II has the following parameters described as follows:

| f1 | f2 | f1/f2 | β = F$_T$/F$_W$ |
|---|---|---|---|
| −34.06 | 17.48 | −1.949 | 1.379 |

As apparent from the above, the focal length changeable lens system shown in FIG. 4 satisfies the condition (I).

FIG. 5 shows diagrams illustrating aberrations, including spherical aberration, field curvature and distortion of the focal length changeable lens system shown in FIG. 4 at the wide angle end (EDW) and the tele-photo end (EDT). As apparent in FIG. 5, the lens system has superior correction for these aberrations.

FIG. 6 shows a further version of the embodiment of the present invention. A focal length changeable lens system comprises a first negative power meniscus element L1 having a concave surface relative to an approximately flat image surface M3 and a second positive power meniscus element L2 having a convex object end surface. Both surfaces of the second element L2 are aspheric. A lens stop D is positioned at a distance of approximately 0.5 mm behind from the image end surface of the element L2. The first lens element L1 is stationary with respect to the lens system. The lens system L2 and fixed lens stop D are adapted to be shifted along the optical axis X as a group during changing the focal length, but in fixed relation to each other during changing the focal length.

The focal length changeable lens system as shown in FIG. 6 scaled to an image frame of 24×36 mm is substantially described in Table III.

TABLE III

| Element | Radius of Curvature (mm) | Axial Distance Between Surfaces (mm) | N | ν |
|---|---|---|---|---|
| L1 | S1 R$_1$ = 26.897 | d$_1$ = 1.5 | 1.49116 | 57.6 |
|  | S2 R$_2$ = 10.289 | d$_2$ = variable |  |  |
| L2 | S3 R$_3$ = 4.251 | d$_3$ = 2.18 | 1.49116 | 57.6 |
|  | S4 R$_4$ = 5.926 |  |  |  |

Aspheric Surface: S3 and S4
Aspheric Parameters:

|  | S3 | S4 |
|---|---|---|
| C | 0.25524 | 0.16875 |
| K | 0.71963 | 6.22969 |
| a1 | −0.11754 × 10$^{-3}$ | 0.10477 × 10$^{-2}$ |
| a2 | −0.15626 × 10$^{-3}$ | −0.25865 × 10$^{-2}$ |
| a3 | 0.31067 × 10$^{-4}$ | 0.10800 × 10$^{-2}$ |
| a4 | −0.34405 × 10$^{-5}$ | −0.18036 × 10$^{-3}$ |

Zooming Parameters:

|  | FL(mm) | BF(mm) | F | 2ω | d$_2$ | Ld |
|---|---|---|---|---|---|---|
| EDW | 29.00 | 34.13 | 10.5 | 73.4° | 14.784 | 52.60 |
| EDT | 50.00 | 45.95 | 13.9 | 46.79° | 2.965 | 52.60 |

The focal length changeable lens system depicted in FIG. 6 and described in Table III has the following parameters described as follows:

| f1 | f2 | f1/f2 | β = F$_T$/F$_W$ |
|---|---|---|---|
| −38.08 | 21.43 | −1.777 | 1.724 |

As apparent from the above, the focal length changeable lens system shown in FIG. 6 satisfies the condition (I).

Figure 7A:
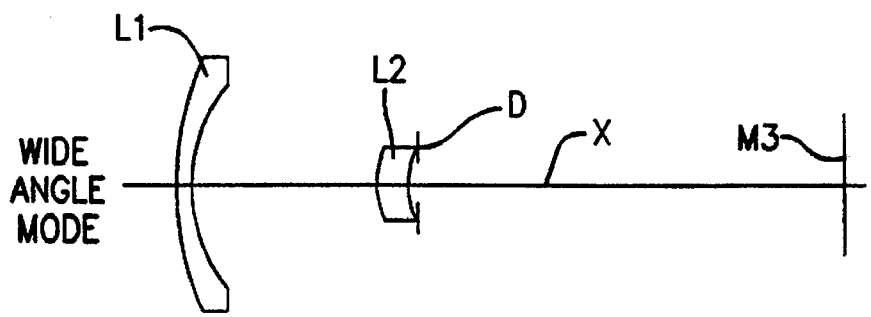
FIG. 7 shows diagrams of aberrations of the focal length changeable lens system of FIG. 6.
Figure 7B:
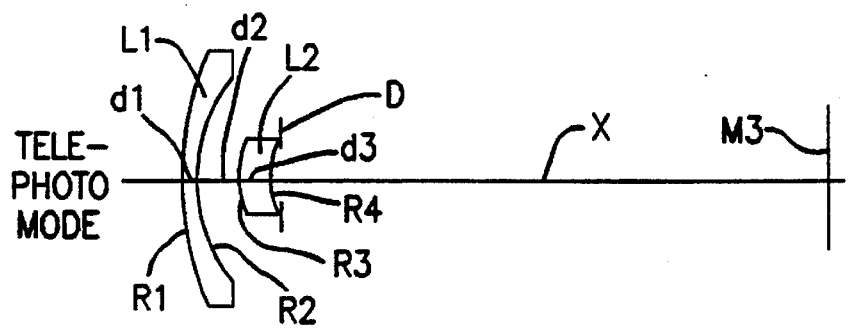
Figure 7C:
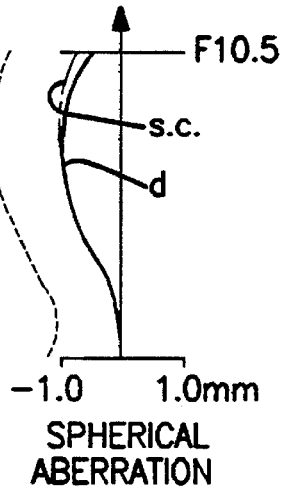

FIG. 7 shows diagrams illustrating aberrations, including spherical aberration, field curvature and distortion of the focal length changeable lens system shown in FIG. 6 at the wide angle end (EDW) and the tele-photo end (EDT). It is apparent in FIG. 7, the lens system has superior correction for these aberrations.

FIGS. 8, 10 and 12 show various versions of another embodiment of the present invention in which a focal length changeable lens system has a focusing feature in addition to being changeable in focal length between two fixed focal length for the wide angle photography and the tele photography.

Referring back to FIG. 1, as was previously described, when the second lens element L2 is moved toward the object end from the wide angle photographic end where the lens system achieves focusing infinity distances, the focal point P shifts toward the object end from the focal plane M. On the other hand, when the second lens element L2 is at the tele-photographic end, as the object distance decreases, the focal point shifts far from the object end, i.e. in a direction opposite to the direction in which the focal point shifts with movement of the second lens element L2 toward the object end. By virtue of this optical relationship, moving the second lens element L2 to some extent toward the object end from the wide angle photographic end enables the lens system to focus near-infinity distances which are within a certain extent of finite distances from infinity. This focusing extent depends upon the particular details of lens design. The lens system achieves focusing from infinity distances to a certain extent of finite distances by adjusting the second lens element L2 in axial position within a certain extent of finite distances from the wide angle photographic end.

Similarly, when the second lens element L2 is at the wide angle photographic end where the lens system focuses infinite distances, as the object distance changes in any direction, the focal point shifts far from or close to the object end. Moving the second lens element L2 to some extent toward the object end from the tele-photographic end enables the lens system to focus near-infinity distances. The lens system achieves focusing from infinity distances to a certain extent of finite distances by adjusting the second lens element L2 in axial position within a certain extent of distances from the tele-photographic end.

FIG. 8 shows a version of the focal length changeable lens according to another embodiment of the present invention. The focal length changeable lens system comprises a first negative power meniscus element L1 having a convex object end surface and a second positive power meniscus element L2 having a convex object end surface. Both surfaces of the second element L2 are aspheric. The lens system further has a lens stop D positioned at a distance of approximately 0.7 mm behind from the image end surface of the element L2. The first lens element L1 is stationary with respect to the lens system. The lens system L2 and fixed lens stop D are adapted to be shifted along the optical axis X as a group during changing the focal length, but in fixed relation to each other during changing the focal length. The lens system forms sharp images at infinite distances on a curved image surface M4 having a radius of −400 mm.

The focal length changeable lens system as shown in FIG. 4 scaled to an image frame of 24×36 mm is substantially described in Table IV.

TABLE IV

| Element | Radius of Curvature (mm) | Axial Distance Between Surfaces (mm) | N | ν |
|---|---|---|---|---|
| L1 | S1 $R_1$ = 59.630 | $d_1$ = 1.5 | 1.49116 | 57.6 |
|  | S2 $R_2$ = 10.795 | $d_2$ = variable |  |  |
| L2 | S3 $R_3$ = 4.865 | $d_3$ = 3.89 | 1.49116 | 57.6 |
|  | S4 $R_4$ = 8.431 |  |  |  |

Aspheric Surface: S3 and S4
Aspheric Parameters:

|  | S3 | S4 |
|---|---|---|
| C | 0.21345 | 0.11861 |
| K | 0.42394 | 3.26160 |
| a1 | $-0.44172 \times 10^{-3}$ | $-0.57294 \times 10^{-3}$ |
| a2 | $0.15673 \times 10^{-3}$ | $0.24544 \times 10^{-2}$ |
| a3 | $-0.18640 \times 10^{-4}$ | $-0.12136 \times 10^{-2}$ |
| a4 | $0.98417 \times 10^{-6}$ | $0.23318 \times 10^{-3}$ |

Zooming Parameters:

|  | FL(mm) | BF(mm) | F | 2ω | $d_2$ | Ld |
|---|---|---|---|---|---|---|
| EDW | 21.00 | 24.01 | 8.5 | 91.7° | 12.185 | 41.58 |
| EDT | 35.00 | 32.26 | 11.5 | 63.4° | 3.926 | 41.58 |

The focal length changeable lens system depicted in FIG. 4 and described in Table IV has the following parameters described as follows:

| f1 | f2 | f1/f2 | $-(F_W \cdot F_T)^{1/2}$ | $f2/F_W$ | $F_W/R3$ | $\beta = F_T/F_W$ |
|---|---|---|---|---|---|---|
| −27.11 | 15.99 | −1.695 | −27.11 | 0.7614 | 4.4824 | 1.667 |

As apparent from the above, the focal length changeable lens system shown in FIG. 8 satisfies the conditions (I)–(III).

The second lens element L2 is moved so as to change the axial distance $d_2$ between 12.185 and 3.926 mm, the lens system gradually changes its overall focal length, achieving a change from the wide angle photography mode to the tele-photography mode, and vice versa. Together, the lens system achieves focusing from infinity to closer distances less than 1 m in the wide angle photography mode when the second lens element L2 is moved within 1.547 mm toward the object end from the wide angle end (EDW). Similarly, the lens system achieves focusing from infinity to closer distances less than 1 m in the tele-photography mode when the second lens element L2 is moved within 1.546 mm toward the object end from the tele-photo end (EDT).

FIG. 9 shows diagrams illustrating aberrations, including spherical aberration, field curvature and distortion of the focal length changeable lens system shown in FIG. 8 at the wide angle end (EDW) and the tele-photo end (EDT). As apparent in FIG. 9, the lens system has superior correction for these aberrations.

Referring to FIG. 10, which shows another version of the other embodiment of the present invention, the focal length changeable lens system comprises a first negative power meniscus element L1 having a convex object end surface and a second positive power meniscus element L2 having a convex object end surface. Both surfaces of the second element L2 are aspheric. The lens system has a lens stop D positioned at a distance of approximately 0.7 mm behind from the image end surface of the element L2. The first lens element L1 is stationary with respect to the lens system. The lens system L2 and fixed lens stop D are adapted to be shifted along the optical axis X as a group during changing the focal length, but in fixed relation to each other during changing the focal length. The lens system forms sharp images at infinite distances on a curved image surface M5 having a radius of −400 mm.

The focal length changeable lens system as shown in FIG. 10 scaled to an image frame of 24×36 mm is substantially described in Table V.

TABLE V

| Element | Radius of Curvature (mm) | Axial Distance Between Surfaces (mm) | N | ν |
|---|---|---|---|---|
| L1 | S1 $R_1$ = 27.844 | $d_1$ = 1.5 | 1.49116 | 57.6 |
|  | S2 $R_2$ = 9.499 | $d_2$ = variable |  |  |
| L2 | S3 $R_3$ = 3.826 | $d_3$ = 2.19 | 1.49116 | 57.6 |
|  | S4 $R_4$ = 5.631 |  |  |  |

Aspheric Surface: S3 and S4
Aspheric Parameters:

|  | S3 | S4 |
|---|---|---|
| C | 0.26137 | 0.17759 |
| K | 0.66479 | 3.37955 |
| a1 | $-0.15711 \times 10^{-2}$ | $-0.93307 \times 10^{-3}$ |
| a2 | $0.31481 \times 10^{-3}$ | $0.25584 \times 10^{-2}$ |
| a3 | $-0.67218 \times 10^{-4}$ | $-0.89512 \times 10^{-3}$ |
| a4 | $0.24980 \times 10^{-5}$ | $0.13618 \times 10^{-3}$ |

Zooming Parameters:

|  | FL(mm) | BF(mm) | F | 2ω | $d_2$ | Ld |
|---|---|---|---|---|---|---|
| EDW | 26.00 | 29.03 | 9.6 | 79.5° | 10.088 | 42.82 |
| EDT | 35.00 | 34.21 | 11.3 | 63.4° | 4.91 | 42.82 |

The focal length changeable lens system depicted in FIG. 4 and described in Table V has the following parameters described as follows:

| f1 | f2 | f1/f2 | $-(F_W \cdot F_T)^{1/2}$ | $f2/F_W$ | $F_W/R3$ | $\beta = F_T/F_W$ |
|---|---|---|---|---|---|---|
| −30.17 | 17.36 | −1.7379 | −30.17 | 0.6677 | 6.7956 | 1.346 |

As apparent from the above, the focal length changeable lens system shown in FIG. 10 satisfies the conditions (I)–(III).

The second lens element L2 is moved so as to change the axial distance $d_2$ between 10.088 and 4.91 mm, the lens system gradually changes its overall focal length, achieving a change from the wide angle photography mode to the tele-photography mode, and vice versa. Together, the lens system achieves focusing from infinity to closer distances less than 2.5 m in the wide angle photography mode when the second lens element L2 is moved within 1.84 mm toward the object end from the wide angle end (EDW). Similarly, the lens system achieves focusing from infinity to closer distances less than 2.5 m in the tele-photography mode when the second lens element L2 is moved within 2.21 mm toward the object end from the tele-photo end (EDT).

FIG. 11 shows diagrams illustrating aberrations, including spherical aberration, field curvature and distortion of the focal length changeable lens system shown in FIG. 10 at the wide angle end (EDW) and the tele-photo end (EDT). As apparent in FIG. 11, the lens system has superior correction for these aberrations.

FIG. 12 shows still another version of the other embodiment of the present invention, the focal length changeable lens system comprises a first negative power meniscus element L1 having a convex object end surface and a second positive power meniscus element L2 having a convex object end surface. Both surfaces of each of the first and second elements L1 and L2 are aspheric. The lens system has a lens stop D positioned at a distance of approximately 0.5 mm behind from the image end surface of the element L2. The first lens element L1 is stationary with respect to the lens system. The lens system L2 and fixed lens stop D are adapted to be shifted along the optical axis X as a group during changing the focal length, but in fixed relation to each other during changing the focal length. In this instance, the image surface M6 is flat.

The focal length changeable lens system as shown in FIG. 12 scaled to an image frame of 24×36 mm is substantially described in Table VI.

TABLE VI

| Element | | Radius of Curvature (mm) | Axial Distance Between Surfaces (mm) | N | ν |
|---|---|---|---|---|---|
| L1 | S1 | $R_1 = 26.145$ | $d_1 = 1.5$ | 1.49116 | 57.6 |
|    | S2 | $R_2 = 10.035$ | $d_2$ = variable | | |
| L2 | S3 | $R_3 = 4.178$ | $d_3 = 2.05$ | 1.49116 | 57.6 |
|    | S4 | $R_4 = 6.293$ | | | |

Aspheric Surface: S1, S2, S3 and S4
Aspheric Parameters:

| | S1 | S2 | S3 | S4 |
|---|---|---|---|---|
| C | 0.03825 | 0.09965 | 0.23935 | 0.15891 |
| K | 0.99254 | −0.14200 | 1.31359 | 6.26253 |
| a1 | $-0.25967 \times 10^{-4}$ | $0.10446 \times 10^{-3}$ | $-0.10346 \times 10^{-2}$ | $0.16919 \times 10^{-2}$ |
| a2 | $-0.14618 \times 10^{-6}$ | $-0.12485 \times 10^{-5}$ | $-0.14780 \times 10^{-3}$ | $-0.24803 \times 10^{-2}$ |
| a3 | 0. | $-0.12131 \times 10^{-8}$ | $-0.39414 \times 10^{-6}$ | $0.14261 \times 10^{-2}$ |
| a4 | 0. | 0 | $-0.491361 \times 10^{-5}$ | $-0.26586 \times 10^{-3}$ |

Zooming Parameters:

| | FL (mm) | BF (mm) | F | 2ω | $d_2$ | Ld |
|---|---|---|---|---|---|---|
| EDW | 26.00 | 30.64 | 10.2 | 79.5° | 12.903 | 47.10 |
| EDT | 45.00 | 41.29 | 13.8 | 51.34° | 2.252 | 47.10 |

The focal length changeable lens system depicted in FIG. 4 and described in Table VI has the following parameters described as follows:

| f1 | f2 | f1/f2 | $-(F_W \cdot F_T)^{1/2}$ | f2/$F_W$ | $F_W$/R3 | $\beta = F_T/F_W$ |
|---|---|---|---|---|---|---|
| −34.21 | 19.17 | −1.7846 | −34.21 | 0.7373 | 6.2231 | 1.7307 |

As apparent from the above, the focal length changeable lens system shown in FIG. 10 satisfies the conditions (I)–(III).

The second lens element L2 is moved so as to change the axial distance $d_2$ between 12.903 and 2.252 mm, the lens system gradually changes its overall focal length, achieving a change from the wide angle photography mode to the tele-photography mode, and vice versa. Together, the lens system achieves focusing from infinity to closer distances less than 1 m in the wide angle photography mode when the second lens element L2 is moved within 2.463 mm toward the object end from the wide angle end (EDW). Similarly, the-lens system achieves focusing from infinity to closer distances less than 1 m in the tele-photography mode when the second lens element L2 is moved within 3.646 mm toward the object end from the tele-photo end (EDT).

FIG. 13 shows diagrams illustrating aberrations, including spherical aberration, field curvature and distortion of the focal length changeable lens system shown in FIG. 12 at the wide angle end (EDW) and the tele-photo end (EDT). As apparent in FIG. 13, the lens system has superior correction for these aberrations.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A lens system comprising in order from the object end to the image end a first singlet component of negative power which is stationary with respect to said lens system and a second singlet component of positive power of which is movable along an optical axis of the lens system, said second singlet component being changed between two specific axial positions so as to yield a short focal length suitable for wide angle photography and a long focal length suitable for tele-photography, respectively, the lens system satisfying the following condition:

$$-2.0 < f1/f2 < -1.7$$

where f1 is the focal length of the first negative power singlet component, and f2 is the focal length of the second positive power singlet component.

2. A lens system as defined in claim 1, wherein each of the first singlet component and the second singlet component is a meniscus lens.

3. A lens system as defined in claim 1, further comprising a lens stop disposed behind an image end surface of the second singlet component.

4. A lens system as defined in claim 1, wherein said second singlet component has an object end aspheric surface and an image end aspheric surface, each aspheric surface being defined by the following relationship:

$$X = Cy^2/(1 + \sqrt{1-(1+K)C^2y^2}) + a1y^4 + a2y^6 + a3y^8 + a4y^{10}$$

where X is the surface sag at a semi-aperture distance y from the optical axis X of the lens system, C is the curvature of a lens surface at the optical axis X equal to the reciprocal of the radius at the optical axis, K is a conic constant, and a1–a2 are aspheric coefficients.

5. A lens system as defined in claim 4 scaled to an image frame of 24×36 mm and having substantially the following characteristics:

| Element | | Radius of Curvature (mm) | Axial Distance Between Surfaces (mm) | N | ν |
|---|---|---|---|---|---|
| L1 | S1 | $R_1 = 12.334$ | $d_1 = 1.5$ | 1.49116 | 57.6 |
|    | S2 | $R_2 = 6.815$ | $d_2$ = variable | | |
| L2 | S3 | $R_3 = 3.502$ | $d_3 = 1.6$ | 1.49116 | 57.6 |
|    | S4 | $R_4 = 5.025$ | | | |

-continued

| Aspheric Parameters: | | |
|---|---|---|
| | S3 | S4 |
| C | 0.28555 | 0.19900 |
| K | 1.321104 | 6.89391 |
| a1 | $-0.17274 \times 10^{-2}$ | $0.22077 \times 10^{-3}$ |
| a2 | $-0.10561 \times 10^{-2}$ | $-0.49381 \times 10^{-2}$ |
| a3 | $0.38793 \times 10^{-3}$ | $0.31032 \times 10^{-2}$ |
| a4 | $-0.86029 \times 10^{-4}$ | $-0.78680 \times 10^{-3}$ |

| Zoom Parameter: | | |
|---|---|---|
| | FLW | FLT |
| FL (mm) | 29.00 | 40.00 |
| $d_2$ (mm) | 10.8 | 12.8 | where the lens system comprises lens elements L1 and L2 having surfaces S1 to S4 and surface radii R1 to R4, $d_1$ to $d_3$ are the axial distances, the index of refraction is given by Nd, the dispersion is defined by the Abbe No. as given by vd, FL is the overall focal length of the lens system for the wide angle photography (TLW) and the tele-photography (FLT).

6. A lens system as defined in claim 4, scaled to an image frame of 24×36 mm and having substantially the following characteristics:

| Element | | Radius of Curvature (mm) | Axial Distance Between Surfaces (mm) | N | v |
|---|---|---|---|---|---|
| L1 | S1 | $R_1 = 26.897$ | | | |
| | | | $d_1 = 1.5$ | 1.49116 | 57.6 |
| | S2 | $R_2 = 10.289$ | | | |
| | | | $d_2 = $ variable | | |
| L2 | S3 | $R_3 = 4.251$ | | | |
| | | | $d_3 = 2.18$ | 1.49116 | 57.6 |
| | S4 | $R_4 = 5.926$ | | | |

| Aspheric Parameters: | | |
|---|---|---|
| | S3 | S4 |
| C | 0.25524 | 0.16875 |
| K | 0.71963 | 6.22969 |
| a1 | $-0.11754 \times 10^{-3}$ | $0.10477 \times 10^{-2}$ |
| a2 | $-0.15626 \times 10^{-3}$ | $-0.25865 \times 10^{-2}$ |
| a3 | $0.31067 \times 10^{-4}$ | $0.10800 \times 10^{-2}$ |
| a4 | $-0.34405 \times 10^{-5}$ | $-0.18036 \times 10^{-3}$ |

| Zoom Parameter: | | |
|---|---|---|
| | FLW | FLT |
| FL (mm) | 29.00 | 50.00 |
| $d_2$ (mm) | 14.784 | 2.965 | where the lens system comprises lens elements L1 and L2 having surfaces S1 to S4 and surface radii R1 to R4, $d_1$ to $d_3$ are the axial distances, the index of refraction is given by Nd, the dispersion is defined by the Abbe No. as given by vd, FL is the overall focal length of the lens system for the wide angle photography (TLW) and the tele-photography (FLT).

7. A lens system as defined in claim 4, wherein said first singlet component has an image end aspheric surface defined by the following relationship:

$$X = Cy^2/(1 + \sqrt{1-(1+K)C^2y^2}) + a1y^4 + a2y^6 + a3y^8 + a4y^{10}$$

where X is the surface sag at a semi-aperture distance y from the optical axis X of the lens system, C is the curvature of a lens surface at the optical axis X equal to the reciprocal of the radius at the optical axis, K is a conic constant, and a1–a2 are aspheric coefficients.

8. A lens system as defined in claim 7 scaled to an image frame of 24×36 mm and having substantially the following characteristics:

| Element | | Radius of Curvature (mm) | Axial Distance Between Surfaces (mm) | N | v |
|---|---|---|---|---|---|
| L1 | S1 | $R_1 = 65.325$ | | | |
| | | | $d_1 = 1.5$ | 1.49116 | 57.6 |
| | S2 | $R_2 = 11.845$ | | | |
| | | | $d_2 = $ variable | | |
| L2 | S3 | $R_3 = 3.848$ | | | |
| | | | $d_3 = 2.0$ | 1.49116 | 57.6 |
| | S4 | $R_4 = 6.376$ | | | |

| Aspheric Parameters: | | | |
|---|---|---|---|
| | S2 | S3 | S4 |
| C | 0.8442 | 0.25988 | 0.15684 |
| K | -11.1246 | 0.72597 | 1.14113 |
| a1 | $0.10936 \times 10^{-2}$ | $-0.43993 \times 10^{-3}$ | $0.29339 \times 10^{-2}$ |
| a2 | $-0.27739 \times 10^{-4}$ | $0.11490 \times 10^{-3}$ | $0.12123 \times 10^{-2}$ |
| a3 | $0.67060 \times 10^{-6}$ | $-0.13634 \times 10^{-4}$ | $-0.56711 \times 10^{-4}$ |
| a4 | $-0.66345 - 10^{-8}$ | $-0.39273 \times 10^{-6}$ | $0.14669 \times 10^{-4}$ |

| Zoom Parameter: | | |
|---|---|---|
| | FLW | FLT |
| FL (mm) | 26.00 | 34.00 |
| $d_2$ (mm) | 5.718 | 1.500 | where the lens system comprises lens elements L1 and L2 having surfaces S1 to S4 and surface radii R1 to R4, $d_1$ to $d_3$ are the axial distances, the index of refraction is given by Nd, the dispersion is defined by the Abbe No. as given by vd, FL is the overall focal length of the lens system for the wide angle photography (TLW) and the tele-photography (FLT).

9. A lens system comprising in order from the object end to the image end a first singlet component of negative power which is stationary with respect to said lens system and a second singlet component of positive power which is movable along an optical axis of the lens system, said second singlet component being changed between two specific axial positions so as to yield a short focal length suitable for wide angle photography and a long focal length suitable for a tele-photography, respectively, and being shiftable from each of the specific axial positions so as to achieve focusing on an object within a certain extent of finite distances from infinity, the lens system satisfying the following conditions:

$$0.6 < f2/FLW < 0.8$$

$$4.0 < FLW/R\ 3 < 7.5$$

where f2 is the focal length of the second singlet component, FLW is the overall focal length of the lens system for the wide angle photography, and R3 is the radius of the object side surface of the second lens element.

10. A lens system as defined in claim 9, wherein each of the first singlet component and the second singlet component is a meniscus lens.

11. A lens system as defined in claim 9, further comprising a lens stop disposed behind an image end surface of the second singlet component.

12. A lens system as defined in claim 9, wherein said second singlet component has an object end aspheric surface and an image end aspheric surface, each aspheric surface being defined by the following relationship:

$$X = Cy^2/(1 + \sqrt{1-(1+K)C^2y^2}) + a1y^4 + a2y^6 + a3y^8 + a4y^{10}$$

where X is the surface sag at a semi-aperture distance y from the optical axis X of the lens system, C is the curvature of a lens surface at the optical axis X equal to the reciprocal of the radius at the optical axis, K is a conic constant, and a1–a2 are aspheric coefficients.

13. A lens system as defined in claim 12 scaled to an image frame of 24×36 mm and having substantially the following characteristics:

| Element | | Radius of Curvature (mm) | Axial Distance Between Surfaces (mm) | N | ν |
|---|---|---|---|---|---|
| L1 | S1 | $R_1 = 59.630$ | $d_1 = 1.5$ | 1.49116 | 57.6 |
|  | S2 | $R_2 = 10.795$ | $d_2$ = variable |  |  |
| L2 | S3 | $R_3 = 4.865$ | $d_3 = 3.89$ | 1.49116 | 57.6 |
|  | S4 | $R_4 = 8.431$ |  |  |  |

| Aspheric Parameters: | | |
|---|---|---|
|  | S3 | S4 |
| C | 0.21345 | 0.11861 |
| K | 0.42394 | 3.26160 |
| a1 | $-0.44172 \times 10^{-3}$ | $-0.57294 \times 10^{-3}$ |
| a2 | $0.15673 \times 10^{-3}$ | $0.24544 \times 10^{-2}$ |
| a3 | $-0.18640 \times 10^{-4}$ | $-0.12136 \times 10^{-2}$ |
| a4 | $0.98417 \times 10^{-6}$ | $0.23318 \times 10^{-3}$ |

| Zoom Parameter: | | |
|---|---|---|
|  | FLW | FLT |
| FL (mm) | 21.00 | 35.00 |
| $d_2$ (mm) | 12.185 | 3.926 |

14. A lens system as defined in claim 12 scaled to an image frame of 24×36 mm and having substantially the following characteristics:

| Element | | Radius of Curvature (mm) | Axial Distance Between Surfaces (mm) | N | ν |
|---|---|---|---|---|---|
| L1 | S1 | $R_1 = 27.844$ | $d_1 = 1.5$ | 1.49116 | 57.6 |
|  | S2 | $R_2 = 9.499$ | $d_2$ = variable |  |  |
| L2 | S3 | $R_3 = 3.826$ | $d_3 = 2.19$ | 1.49116 | 57.6 |
|  | S4 | $R_4 = 5.631$ |  |  |  |

| Aspheric Parameters: | | |
|---|---|---|
|  | S3 | S4 |
| C | 0.26137 | 0.17759 |
| K | 0.66479 | 3.37955 |
| a1 | $-0.15711 \times 10^{-2}$ | $-0.93307 \times 10^{-3}$ |
| a2 | $0.31481 \times 10^{-3}$ | $0.25584 \times 10^{-2}$ |
| a3 | $-0.67218 \times 10^{-4}$ | $-0.89512 \times 10^{-3}$ |
| a4 | $0.24980 \times 10^{-5}$ | $0.13618 \times 10^{-3}$ |

| Zoom Parameter: | | |
|---|---|---|
|  | FLW | FLT |
| FL (mm) | 26.00 | 35.00 |
| $d_2$ (mm) | 10.088 | 4.91 |

15. A lens system as defined in claim 12, wherein said first singlet component has an object end aspheric surface and an image end aspheric surface defined by the following relationship:

$$X = Cy^2/(1 + \sqrt{1-(1+K)C^2y^2}) + a1y^4 + a2y^6 + a3y^8 + a4y^{10}$$

where X is the surface sag at a semi-aperture distance y from the optical axis X of the lens system, C is the curvature of a lens surface at the optical axis X equal to the reciprocal of the radius at the optical axis, K is a conic constant, and a1–a2 are aspheric coefficients.

| Element | | Radius of Curvature (mm) | Axial Distance Between Surfaces (mm) | N | ν |
|---|---|---|---|---|---|
| L1 | S1 | $R_1 = 26.145$ | $d_1 = 1.5$ | 1.49116 | 57.6 |
|  | S2 | $R_2 = 10.035$ | $d_2$ = variable |  |  |
| L2 | S3 | $R_3 = 4.178$ | $d_3 = 2.05$ | 1.49116 | 57.6 |
|  | S4 | $R_4 = 6.293$ |  |  |  |

| Aspheric Parameters: | | | | |
|---|---|---|---|---|
|  | S1 | S2 | S3 | S4 |
| C | 0.03825 | 0.09965 | 0.23935 | 0.15891 |
| K | 0.99254 | −0.14200 | 1.31359 | 6.26253 |
| a1 | $-0.25967 \times 10^{-4}$ | $0.10446 \times 10^{-3}$ | $-0.10346 \times 10^{-2}$ | $0.16919 \times 10^{-2}$ |
| a2 | $-0.14618 \times 10^{-6}$ | $-0.12485 \times 10^{-5}$ | $-0.14780 \times 10^{-3}$ | $0.34803 \times 10^{-2}$ |
| a3 | 0. | $-0.12131 \times 10^{-8}$ | $-0.39414 \times 10^{-6}$ | $0.14261 \times 10^{-2}$ |
| a4 | 0. | 0 | $-0.491361 \times 10^{-5}$ | $-0.26586 \times 10^{-3}$ |

| Zooming Parameters: | | |
|---|---|---|
|  | FLW | FLT |
| FL (mm) | 26.00 | 45.00 |
| $d_2$ (mm) | 12.903 | 2.252 |

16. A lens system as defined in claim 9, further satisfying the following conditions:

$-2.0 < f1/f2 < -1.7$ where f1 is the focal length of the first singlet component.

* * * * *